(12) United States Patent
Schotten

(10) Patent No.: US 7,724,719 B2
(45) Date of Patent: May 25, 2010

(54) MULTISTAGE DESPREADING OF SPREAD SPECTRUM COMMUNICATIONS SIGNALS

(75) Inventor: Hans-Dieter Schotten, Nuremberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 851 days.

(21) Appl. No.: 10/595,008

(22) PCT Filed: Jun. 18, 2003

(86) PCT No.: PCT/EP03/06485

§ 371 (c)(1),
(2), (4) Date: Oct. 26, 2006

(87) PCT Pub. No.: WO2005/004347

PCT Pub. Date: Jan. 13, 2005

(65) Prior Publication Data

US 2007/0160013 A1    Jul. 12, 2007

(51) Int. Cl.
*H04B 7/216* (2006.01)
(52) U.S. Cl. ............... 370/342; 370/335; 370/479
(58) Field of Classification Search ............... 370/203
See application file for complete search history.

(56) References Cited

U.S. PATENT DOCUMENTS

| 5,768,307 | A  | * | 6/1998 | Schramm et al. ............. 375/150 |
| 6,222,875 | B1 | * | 4/2001 | Dahlman et al. ............. 375/130 |
| 2002/0154615 | A1 | | 10/2002 | Beckmann et al. |
| 2004/0034676 | A1 | * | 2/2004 | Reshef et al. ............... 708/400 |

OTHER PUBLICATIONS

Harri Holma et al., "WCDMA for UMTS $2^{nd}$ Edition", Sep. 2002, Chapter 3.3, pp. 33-36, John Wiley & Sons Ltd., New York, NY/USA.
European Patent Office, International Search Report for PCT/EP03/06485, dated Feb. 16, 2004.

* cited by examiner

*Primary Examiner*—Huy D Vu
*Assistant Examiner*—Michael J Digiovanni
(74) *Attorney, Agent, or Firm*—Roger S. Burleigh

(57) ABSTRACT

A method and a component for despreading a multi-code signal that has been generated using two or more spreading codes with different spreading factors are described. The method comprises subjecting the signal to a first despreading step (40) that includes a first Fast Hadamard Transform (FHT) to jointly despread the spreading codes. During the first despreading step one or more spreading codes are despread only partially. The signal or signal portion including one or more partially despread spreading codes are then subjected to one or more further despreading steps (42).

12 Claims, 5 Drawing Sheets

MULTISTAGE DESPREADING OF SPREAD SPECTRUM COMMUNICATIONS SIGNALS

FIELD OF THE INVENTION

The present invention relates to spread spectrum communications systems and, in particular, to the despreading of spread spectrum communications signals.

BACKGROUND OF THE INVENTION

Wireless communications is growing unabated. The predominant problem with respect to a continued growth is the fact that while the amount of electromagnetic spectrum available for wireless communications is limited, novel applications and an increasing number of customers necessitate an ever increasing data throughput. Thus, innovative solutions are required to meet these increasing capacity needs.

Spread spectrum communications is one of the solutions for efficiently using limited spectrum resources. In a spread spectrum transmitter, a digital bit stream at a basic data rate is spread to a transmit pulse rate, also called chip rate. This spreading operation involves applying a user unique spreading (or channelization) code to the bit stream that increases its bandwidth. Additionally, scrambling can be performed. The resulting pulse sequence (chips) is then modulated to generate an output signal. This output signal is added to other similarly processed output signals for multi-channel transmission over a communications medium. The fundamentals of spreading and scrambling are described in more detail in chapter 3.3 of Harri Holma and Antti Toskala, WCDMA for UMTS, John Wiley & Sons Ltd., second edition, 2002.

The output signals of multiple users (channels) advantageously share one transmission communications frequency, with the multiple signals appearing to be located on top of each other in both the frequency domain and the time domain. Because the applied spreading codes are user unique, however, each output signal transmitted over the shared communications frequency is similarly unique. Therefore, through the application of proper processing techniques at a receiver the individual output signals associated with individual users may be distinguished from each other.

In a spread spectrum receiver the received signals are demodulated and the appropriate digital code for the user of interest is applied to despread the desired transmitted signal and return to the basic data rate. The despreading operation thus comprises a correlation process comparing the received signal with the appropriate digital spreading code.

Modern spread spectrum receivers usually have to despread more than one spreading code simultaneously. To keep in such multi-code scenarios the complexity and power consumption of the despreading operation as small as possible, efficient techniques for jointly despreading two or more different spreading codes have to be implemented. Usually, these techniques perform quite well if the spreading codes have the same spreading factor, i.e. an identical code length.

Often, however, multi-code transmission is based on spreading codes with different spreading factors. There is thus a need for a method and a device for efficiently despreading a multi-code signal that has been generated using two or more spreading codes with different spreading factors.

SUMMARY OF THE INVENTION

As regards a method, this need is satisfied according to the invention by subjecting the multi-code signal to a first despreading step that includes a first Fast Hadamard Transform (FHT) to jointly despread the spreading codes, wherein during the first despreading step despreading by a factor lower than or equal to the lowest spreading factor is performed so that one or more spreading codes are despread only partially. The signal or signal portion including one or more partially despread spreading codes is subjected to one or more further despreading steps.

Thus, the individual spreading codes of different spreading factors comprised in the multi-code signal are initially despread jointly. This allows in many cases to reduce the complexity of the despreading operation as a whole.

The individual despreading steps may be performed in a cascaded manner. According to a preferred implementation the cascadation includes splitting the signal paths after a particular despreading step into one or more signal paths that carry completely despread signals and one or more further signal paths carrying signals that have to be despread further. Thus, a signal portion that has been spread with a spreading code of a higher spreading factor may be subjected to more individual despreading steps than a signal portion that has been spread with a spreading code of a lower spreading factor.

Preferably, the first FHT, that is performed in the course of the first despreading step, is correlated with the lowest spreading factor. If, for example, the lowest spreading factor is N, i.e. the corresponding spreading code consists of a sequence of N individual code elements, the FHT may have a dimension of N×N. Alternatively, the first FHT may have a fixed dimension that is independent from (e.g. lower than) the lowest spreading factor appearing in the multi-code signal to be despread.

The first or any further despreading step may include one or more permutation operations. A permutation operation may provide a one-to-one mapping of an input sample stream onto an output sample stream. The mapping may be used for various purposes like the sorting of signal portions associated with different spreading factors. In the most simple cases the permutation operation may be based on a unity matrix.

In the first despreading step the permutation operation may be performed before or after the first FHT. In principle, it may also be performed both before and after the first FHT. Performing the permutation operation before the first FHT is advantageous in the case orthogonal pn or Gold spreading codes have to be despread. Of course, one or more permutation operations may also be performed in the one or more despreading steps following the first despreading step.

One or more of the despreading steps may include a serial-to-parallel conversion. Such a conversion may be used to convert an asynchronous sample stream into a synchronous sample stream. The serial-to-parallel conversion may be accompanied by a reduction of the sampling rate. According to one variant of the invention, a serial-to-parallel conversion precedes at least one of the first FHT and any following FHT.

As has been mentioned before, the first despreading step is followed by one or more further despreading steps that aim in particular at despreading the spreading codes that have not yet been completely despread during the first despreading step. The further despreading steps may be configured identical with the first despreading step or different therefrom. Advantageously, the one or more further despreading steps include at least one of a decimating operation, a switching operation, a summation operation, a second, third, etc. FHT, a serial-to-parallel conversion and a multiplication operation. A single one or a combination of these operations may allow to further despread any partially despread spreading codes.

According to a first variant of the invention an individual further despreading step includes a decimating operation that reduces the sampling rate with respect to a subsequent signal branch. Such a decimating operation may include a switching step during which a sequence of input samples is distributed according to a predefined distribution scheme over two or more signal branches. In each signal branch a summation operation may be performed and the outputs of the summation operations could be used as input for a further FHT.

According to a second variant of the invention a particular further despreading step includes a multiplication operation during which a partially despread spreading code is multiplied with a constant or varying factor, e.g. a weighting factor, or a repetitive sequence of factors. The multiplication operation may be followed by a summation operation. The summation operation, which may also be performed independently from a multiplication operation, may be configured to calculate the sum of two or more consecutive signal portions (e.g. samples) and to provide an output signal in the form of the calculated sum.

According to a third variant of the invention a specific further despreading step following the first despreading step includes a further FHT. For every output path of the further FHT a summation operation may be performed.

The above variants may be combined in any order and may additionally be implemented in the first despreading step.

The first or any further FHT could be a full FHT or a reduced FHT. A reduced FHT denotes an approach where certain operations in the FHT are not performed. For example operations resulting in intermediate sums which are not used in any of the next FHT steps may be omitted.

The invention may be implemented as software, as a piece of hardware, or as a combination thereof. Thus, the invention also relates to a computer program product with program code portions for performing the individual steps of the invention when the computer program product is run on a computing device. The computer program product may be stored on a computer-readable data carrier.

As regards a hardware solution, the invention relates to a despreading component for despreading a multi-code signal that has been generated using two or more spreading codes with different spreading factors. The despreading component comprises a first despreading stage for performing a first despreading step that includes a first FHT to jointly despread the spreading codes by a factor lower than or equal to the lowest spreading factor so that one or more spreading codes are despread only partially. The despreading component further comprises at least a second despreading stage for performing one or more further despreading steps with respect to the signal or a signal portion that includes one or more partially despread spreading codes.

The despreading component may be part of a wireless communications receiver. For example the despreading component may be located within a terminal device (e.g. within a mobile telephone) or within a network node like a radio base station.

BRIEF DESCRIPTION OF THE DRAWINGS

A more complete understanding of the method and device of the present invention may be obtained by reference to the following detailed description when taken in conjunction with the accompanying drawings, wherein.

DETAILED DESCRIPTION OF PREFERRED EMBODIMENTS

In the following description, for the purposes of explanation and not limitation, specific details are set forth, such as particular embodiments, signal formats etc. in order to provide a thorough understanding of the present invention. It will be apparent to one skilled in the art that the present invention may be practiced in other embodiments that depart from these specific details. In particular, while some of the following embodiments are described herein below incorporated in a wide band code division multiple access (WCDMA) system, the present invention is not limited to such an implementation but can be utilized in any transmission environment that allows multi-code transmission techniques. Moreover, those skilled in the art will appreciate that the functions explained herein below may be implemented using individual hardware circuitry, using software functioning in conjunction with a programmed microprocessor or a general purpose computer; using an application specific integrated circuit (ASIC), and/or using one or more digital signal processors (DSPs).

Figure 1:
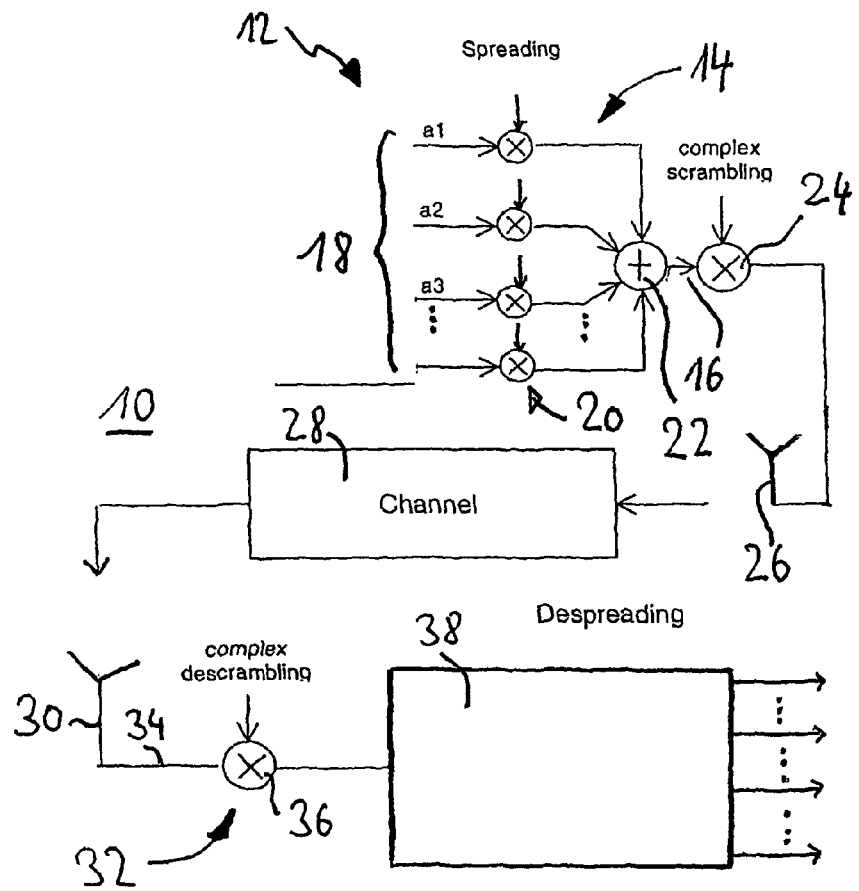
FIG. 1 is a block diagram of a spread spectrum communications system including a despreading component according to the invention.

Reference is now made to FIG. 1 which depicts a block diagram of a direct-sequence spread spectrum communications system 10 according to the invention. FIG. 1 illustrates the generation of a multi-code signal using orthogonal codes of different spreading factors (SFs).

Within a transmitter 12 informational data streams comprising symbols a1, a2, a3, . . . are received on lines 18. The informational data streams may have different symbol rates. A multi-code spreader 14 impresses much higher rate chip streams known as spreading sequences onto the informational data streams. The spread informational data streams are added by adder 22 to generate on line 16 a multicode signal.

As becomes apparent from FIG. 1, the spreader 14 includes four individual signal paths and an individual multiplier 20 in each signal path. By means of the multipliers 20 the actual spreading of the informational data streams is performed by weighting a particular periodical spreading sequence with an informational data stream (1 data stream symbol per spreading sequence period). If the informational bits of the informational data streams are assigned values of plus or minus 1, the logical combination can be expressed as an arithmetic multiplication. The set of code words used by the spreader 14 could be an orthogonal set, such as the Walsh or Hadamard code word sets.

The multi-code signal output by the spreader 14 on line 16 is input to a scrambler 24. The scrambler 24 is configured as a multiplier that multiplies the spread data sequence output by the spreader 14 chip-wise with a complex scrambling code.

In addition to spreading, part of the process performed in the transmitter 11 is a scrambling operation performed by the scrambler 24. This is needed to separate terminals or base stations from each other. Scrambling is used on top of spreading, so it does not change the signal bandwidth but only makes the signals from different sources separable from each other. As has been mentioned before, transmissions from a single source are separated using the spreading codes. With the scrambling, it would not matter if the actual spreading was done with identical spreading codes for several transmitters.

The scrambled multi-code signal output by the scrambler 24 is then modulated onto a radio-frequency (RF) carrier by a modulator not depicted in FIG. 1. If the symbols of the spread data sequence are binary, then binary phase shift keying (BPSK) may be effected by the modulator. If the symbols of the spread data sequence are complex, however, quadrature phase shift keying (QPSK) or offset-QPSK may be effected by the modulator.

The modulated multi-code signal is then passed to a broadcast antenna 26 for transmitting the signal using electromagnetic waves via a channel 28.

A receive antenna 30 of a receiver 32 collects the signal energy of the transmitted modulated multi-code signal. In the receiver 32, the multi-code signal is amplified, filtered, mixed and analogue-to-digital converted (not shown) as necessary to convert the received multi-code signal to a multi-code baseband signal on line 34.

The multi-code baseband signal is input to a descrambler 36 and the descrambled signal output by the descrambler 36 is fed to a despreading component 38. The despreading component 38 despreads the multi-code signal and outputs inter alia estimates for the symbols a1, a2, a3, . . . .

As has been mentioned above, the multi-code signal that has to be despread by the despreading component 38 has been generated using a plurality of spreading codes with different spreading factors. Thus, the despreading component 38 includes a plurality of despreading stages for performing a cascaded despreading of the multi-code signal. Several cascaded despreading approaches will be discussed below in more detail.

Each of these despreading approaches comprises a first despreading step including an FHT to jointly despread the spreading codes based on which the multi-code signal has been generated. Applying a butterfly structure known from the Fast Fourier Transform (FFT), the FHT reduces the number of operations required for the despreading of the multi-code signal that has been built on classes of orthogonal binary signals.

Figure 2:
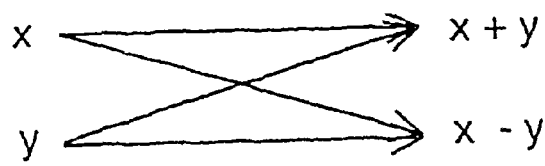
FIG. 2 illustrates the principle of a Fast Hadamard Transform.

In FIG. 2, this basic element (butterfly structure) of the FHT is shown. Based on complex input samples x and y, the butterfly structure is utilized to calculate the sum x+y and the difference x−y of the input samples. Classes of spreading codes that can be handled by the FHT comprise the Walsh-Hadamard codes on which the WCDMA code-tree is based as well as sets of orthogonal Gold codes. The Gold codes are permutations of Walsh-Hadamard codes. Of course, other sets of orthogonal codes could be despread as well using an FHT.

Figure 3:
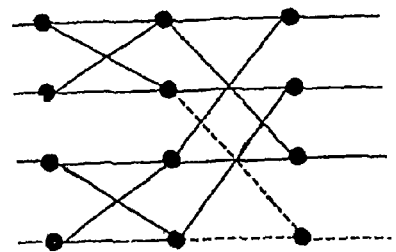
FIG. 3 illustrates a reduced Fast Hadamard Transform.

The one or more FHTs performed by the despreading component 38 can be full FHTs or reduced FHTs. A full FHTs denotes the application of a complete FHT whereas a reduced FHT denotes an optimized approach as regards the omission of certain operations. For example operations resulting in intermediate sums which are not used in any of the further steps of a particular FHT may not be performed. An example for a reduced FHT is depicted in FIG. 3. The dashed lines denote omitted operations.

In the following, several exemplary implementations of the despreading component 38 depicted in FIG. 1 will be discussed with reference to FIGS. 4 to 7. The approaches shown in FIGS. 4 to 7 relate to configurations not limited to the WCDMA transmission scenario depicted in FIG. 1.

Figure 4:
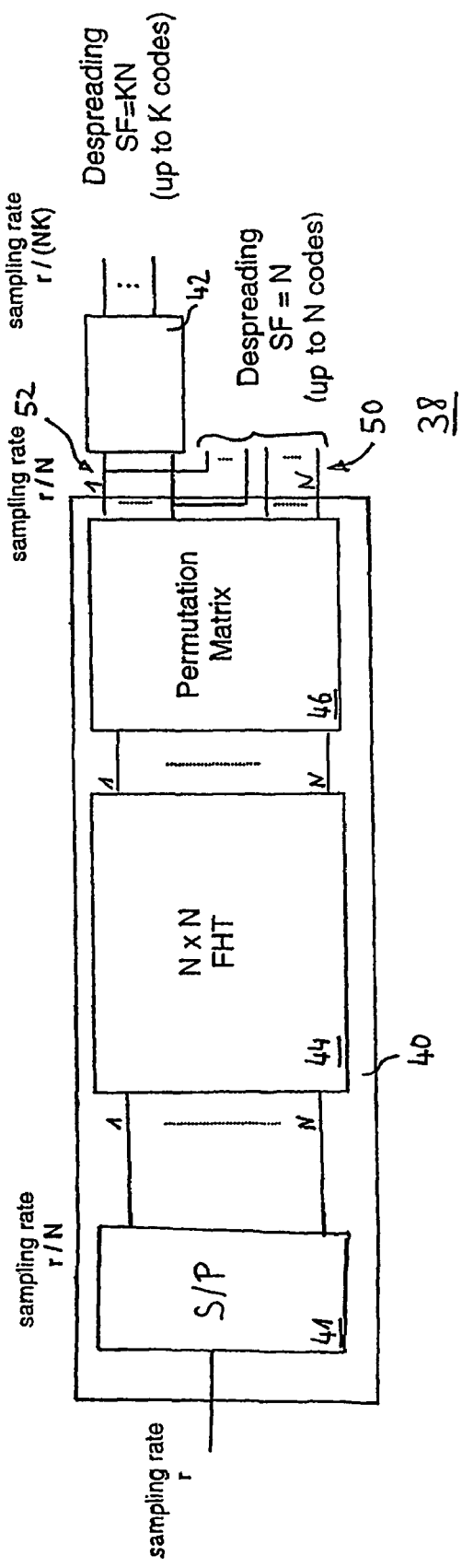
FIG. 4 is a block diagram of a first embodiment of a despreading component according to the invention.

FIG. 4 shows a first embodiment of a despreading component 38 according to the invention. The despreading component 38 of FIG. 4 is configured to despread spreading codes of two different spreading factors. More specifically, FIG. 4 shows a configuration of a despreading component 38 for despreading up to N codes of spreading factor SF=N and up to K spreading codes of spreading factor SF=KN. The approach depicted in FIG. 4 could be generalized as regards the joint despreading of spreading codes with three or more different spreading factors.

The despreading component 38 of FIG. 4 comprises a first despreading stage 40 and a second despreading stage 42. The first despreading stage 40 includes a serial-to-parallel converter 41, a component 44 for performing an FHT of dimension N×N and a permutation component 46 coupled to the outputs of the FHT component 44. The second despreading stage 42 is configured to perform a further FHT with respect to a subset of the outputs of the first despreading stage 40 and may include additional processing components not depicted in FIG. 4.

It should be noted that additional serial-to-parallel converters, permutation components and FHT components could be added as necessary. For example a third despreading stage not depicted in FIG. 1 may be configured to perform a further despreading operation with respect to a subset of the outputs of the second despreading stage 42, and so on. Since in general a subsequent despreading stage will only process a subset of the outputs of a preceding despreading stage, despreading is performed in a cascaded manner.

Now the operation of the despreading component 38 depicted in FIG. 4 will be described in more detail. As becomes apparent from FIG. 4, the despreading component 38 has a single input for receiving a stream of descrambled multi-code input samples at a sampling rate r. In the first despreading stage 40 the input samples are first subjected to a serial-to-parallel conversion in the serial-to-parallel converter 41. The serial-to-parallel converter 41 successively builds blocks of N input samples and outputs the input samples block-wise via N outputs. By this the output sampling rate is reduced by a factor of 1/N.

The component 44 for performing an N×N FHT has N inputs and receives the sample blocks output by the serial-to-parallel converter 41. In the FHT component 44 the sample blocks are subjected to an FHT of dimension N×N.

The dimension of the FHT performed in the component 44 has been chosen such that it corresponds to the lowest spreading factor SF=N utilized during the generation of the multi-code signal in the transmitter 12 of FIG. 1. Thus, the spreading code with the lowest spreading factor SF=N will be despread completely within the FHT component 44 so that the one or more informational data streams that have been spread with the lowest spreading factor SF=N can be recovered. On the other hand, a portion of the multi-code signal that is associated with spreading codes of higher spreading factors will be despread only partially by the FHT of dimension N×N and will have to be despread further in the second despreading stage 42.

It should be noted that in principle the FHT component 44 could be configured to perform an FHT of dimension M×M, wherein M<N. In such a case the spreading code with the lowest spreading factor SF=N will be despread only partially within the FHT component 44. This means that after the M×M FHT the spreading code with the lowest spreading factor has to be despread further like the spreading codes with higher spreading factors.

The FHT component 44 of FIG. 4 outputs the transformed samples via N outputs at the sampling rate of r/N. The samples output by the FHT component 44 are input to the permutation component 46. In the permutation component 46, the samples received via the N outputs from the FHT component 44 are subjected to a permutation operation that provides a one-to-one mapping of an input sample stream onto an output sample stream.

In the most simple case the permutation matrix applied during the permutation operation is a unity matrix not changing anything. In such a case the permutation component 46 may as well be omitted. In more complex cases the permutation component 46 is used to separate the sample streams output by the FHT component 44. This separation is performed such that samples relating to an informational data stream that has been recovered during the FHT performed in the FHT component 44 are output via one or more first outputs 50 of the first despreading stage 40 and samples that have not yet been despread completely are output by a one or more second outputs 52 of the first despreading stage 40 that are coupled to the second despreading stage 42.

The permutation operation performed by the permutation component 46 will neither result in a processing delay nor does it require any kind of data processing. Thus, the sampling rate r/N at the outputs 50, 52 of the permutation component 46 is identical to the sampling rate r/N at the inputs of the permutation component 46. In some cases, i.e. if orthogonal pn or Gold codes have to be despread, a further permutation component not depicted in FIG. 4 may be arranged within the first despreading stage 40 before the FHT component 44.

As has been mentioned above, the permutation operation performed by the permutation component 46 separates the one or more informational data streams that have been completely despread by the N×N FHT performed in the FHT component 44 is from the one or more sample streams that have been despread only partially by this N×N FHT and that have to be despread further. These one or more sample streams are output via the second outputs 52 of the first despreading stage 40 to the second despreading stage 42.

The second despreading stage 42 includes several serial-to-parallel converters arranged in parallel, an optional permutation component for sorting the outputs of the serial-to-parallel converters and two or more parallel FHT components receiving the optionally permutated outputs of the serial-to-parallel converters (not depicted). Each of the FHT components of the second despreading stage 42 performs an FHT of dimension K×K. The informational data streams that have been spread with a spreading factor SF=K×N and that have been despread only partially by the N×N FHT are further despread by the K×K FHTs performed in the second despreading stage 42. The second despreading stage then outputs up to K informational data streams that have now been despread completely. Due to the serial-to-parallel conversion performed during the second despreading step the sampling rate is reduced from r/N at the input of the second despreading stage 42 to r/(N×K) at the output of the second despreading stage 42.

Figure 5:
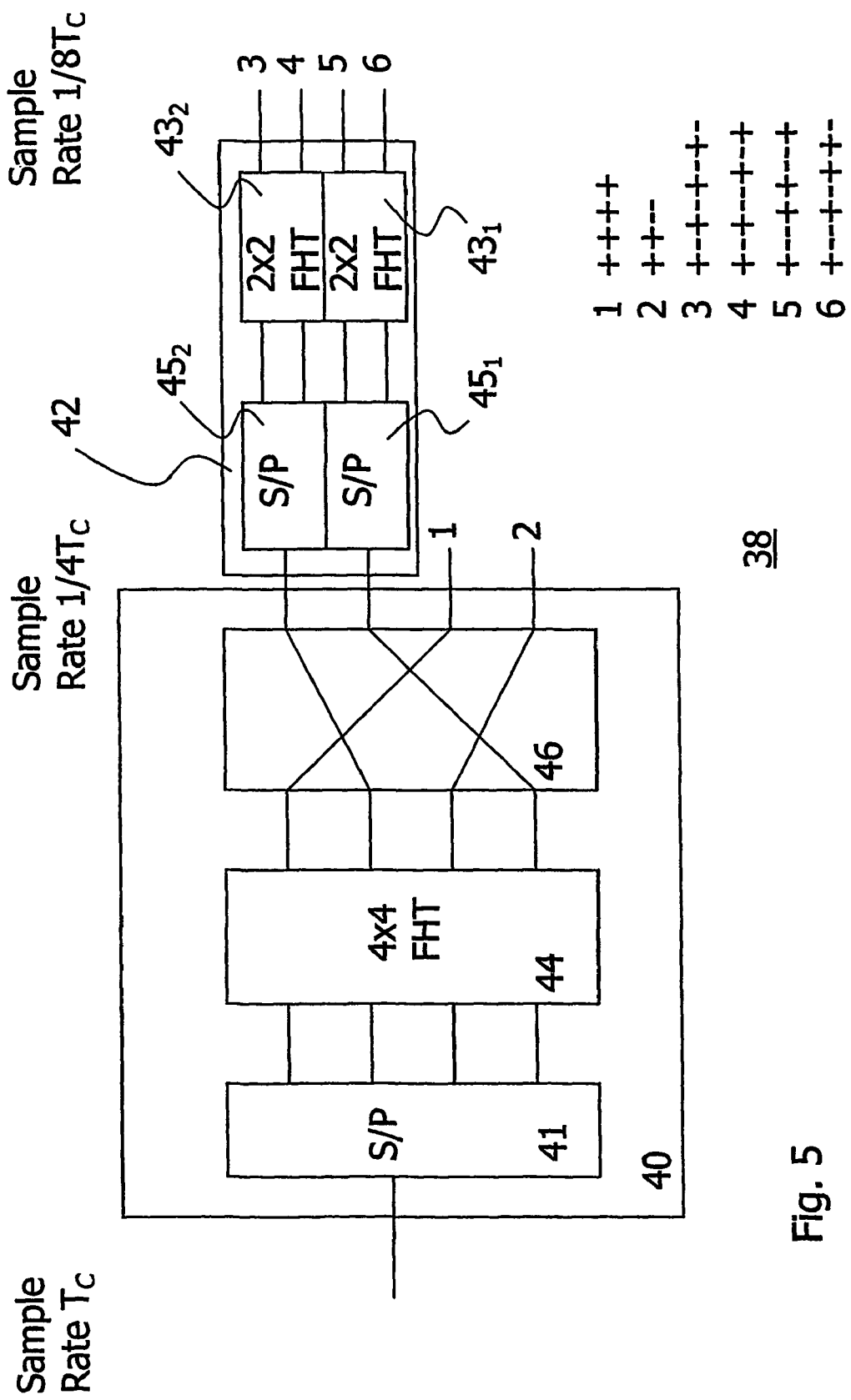
FIG. 5 is a block diagram illustrating a possible realization of the first embodiment depicted in FIG. 4.

In FIG. 5 a practical realization of the despreading component 38 depicted in FIG. 4 is shown. The despreading component 38 of FIG. 5 is configured to despread a multi-code signal that has been generated using six different spreading codes. As becomes apparent from FIG. 5, two of the six spreading codes (codes 1 and 2) have a spreading factor of four and the remaining four codes (codes 3 to 6) have a spreading factor of eight.

Thus, the FHT component 44 of the first despreading stage 40 is configured to perform a FHT of dimension 4×4. This means that the original informational or data streams that have been spread with the spreading factor 4 are despread completely within the first despreading stage 40 and output via the outputs 1 and 2 of the first despreading stage 40 at a symbol rate of ¼ $T_C$, $1/T_C$ being the chip rate.

The remaining two outputs of the despreading stage 40 are coupled to the second despreading stage 42. More specifically, each of the two outputs is coupled to an individual serial-to-parallel converter $45_1$, $45_2$ of the second despreading stage 42. Each of the serial-to-parallel converters $45_1$, $45_2$ outputs data blocks consisting of two samples thus reducing the symbol rate by a factor of 2. The serial-to-parallel converter $45_1$, $45_2$ are each coupled to a FHT component $43_1$, $43_2$ of the second despreading stage 42. The FHT components $43_1$, $43_2$ perform an FHT of dimension 2×2 to completely despread the remaining signal portions that have been despread only partially within the first despreading stage 40. The second despreading stage 42 has four outputs 3, 4, 5 and 6 for outputting the completely despread remaining four informational data streams at a reduced symbol rate of ⅛ $T_C$.

Figure 6:
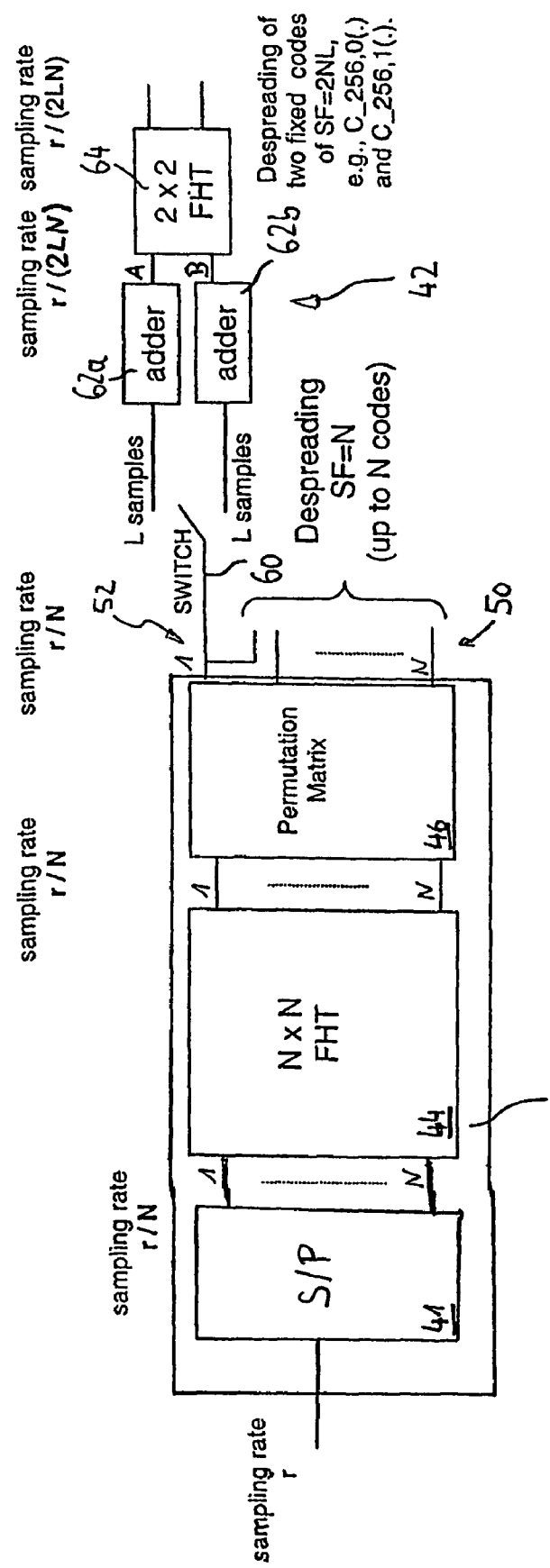
FIG. 6 is a block diagram of a despreading component according to a second embodiment of the invention.

FIG. 6 shows a second embodiment of a despreading component 38 according to the invention. The despreading component 38 of FIG. 6 is configured to despread spreading codes of two different spreading factors. More specifically, the despreading component 38 of FIG. 6 allows to despread up to N codes of spreading factor SF=N and to despread two fixed codes of spreading factor SF=2 NL. A generalisation of the approach depicted in FIG. 6 as regards joint despreading of spreading codes with three or more different spreading factors is possible.

The despreading component 38 of FIG. 6 has some components with similar functions like the despreading component of the first embodiment that has been described with reference to FIG. 4. Thus, similar elements will be denoted with similar reference numerals and a more detailed description thereof is omitted.

Like the despreading component of the first embodiment, the despreading component of the second embodiment depicted in FIG. 6 includes a first despreading stage 40 and a second despreading stage 42. The first despreading stage 40 is identical with the first despreading stage of the despreading component of the first embodiment. Thus, the despreading stage 40 includes a plurality of first outputs 50 for fully despread informational data streams. A second despreading stage 42 is coupled to a single second output 52 of the first despreading stage 40. Via this second output 52, the signal portion including the spreading codes of spreading factor SF=2 NL that have been despread only partially in the first despreading stage 40 are output for being further despread in the second despreading stage 42.

As can be seen from FIG. 6, the second despreading stage 42 includes a switch 60 that distributes the sample sequence output by the first despreading stage 40 over two signal branches. The switch 60 operates such that the first L samples of the sample stream output by a specific output 52 of the despreading stage 40 are fed to the upper signal branch, the following L samples are fed to the lower signal branch, the following L samples are fed to the upper signal branch again and so on. In each of the two signal branches an individual adder 62a, 62b is arranged for summing sequences of L consecutive samples and outputting the sums thus obtained. The sampling rate is reduced from r/N at the output of a first despreading stage 40 to r/(2LN) at the output of each of the adders 62a, 62b. The combination of the switch 60 and the adders 62a, 62b fulfills a similar task as the serial-to-parallel converters used in the second despreading stage of the first embodiment described with reference to FIGS. 4 and 5.

As shown in FIG. 6 the outputs of the two adders 62a, 62b are input to a component 64 for performing a FHT of dimension 2×2. The FHT component 64 outputs two informational data streams at a sampling rate that has been reduced further to r/(2 LN).

In the following, the scenario depicted in FIG. 6 is exemplarily described in a WCDMA context for the joint despreading of the common pilot channel (CPICH) and the primary common control physical channel (P-CCPCH) as well as some further channels. In WCDMA, the CPICH and P-CCPCH are assigned the fixed spreading codes CH_256,0 and Ch_256,1, respectively. These spreading codes have a length (spreading factor) of 256 and can be written as (++++ . . . ++++ ++++ . . . ++++) and (++++ . . . ++++ ---- . . . ----), The further channels that are to be jointly despread with the CPICH and P-CCPCH are assigned spreading codes of an identical length N<256.

When the multi-code signal including the CPICH and the P-CCPCH (both having been spread with a spreading code of spreading factor SF=256) and the remaining channels (that have been spread using a spreading factor SF=N<256) is input into the despreading component 38, the channels that have been spread with a spreading factor SF=N will be completely despread within the first despreading stage 40. The informational data streams associated with these channels will thus be output via the first outputs 50 of the first despreading stage 40.

The CPICH and P-CCPCH, that have been spread with a spreading code having a higher spreading factor SF=256, are despread within the first despreading stage 40 only partially. The partially despread samples associated with these two channels are output via the second output 52 of the first processing stage and input to the second processing stage 42. By means of the switch 60 and the two adders 62$a$, 62$b$ of the second despreading stage 42 two sums A and B are calculated. The first sum A is output by the adder 62$a$ in the upper branch of the second despreading stage 42 and the second sum B is output by the adder 62$b$ that is arranged in the lower branch. In order to get the despread values for the CPICH and the P-CCPCH, the sum A+B and the difference A−B have to be calculated. This corresponds to an FHT of dimension 2×2 which is performed within the FHT component 64.

Figure 7:
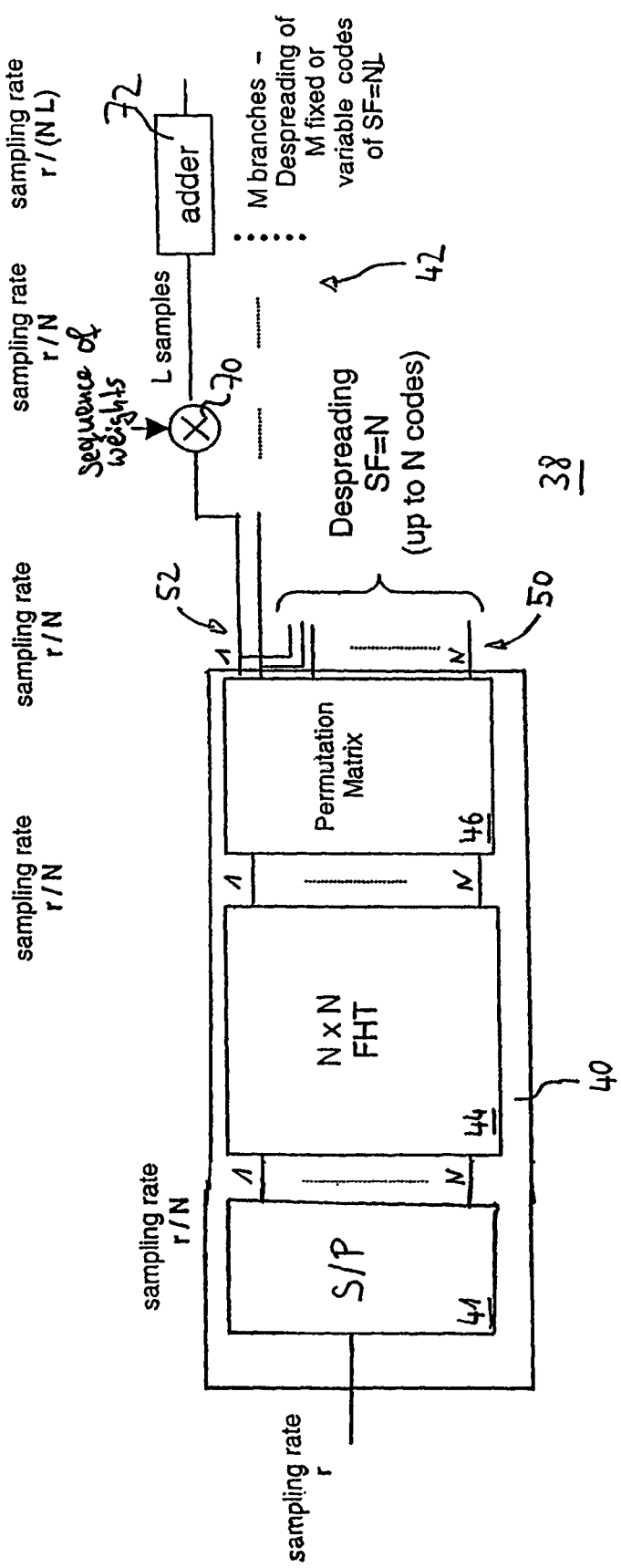
FIG. 7 is a block diagram of despreading component according to a third embodiment of the invention.

FIG. 7 shows a third embodiment of a despreading component 38 according to the invention. The despreading component 38 of FIG. 7 is configured to despread spreading codes of two different spreading factors. More specifically, FIG. 7 shows a configuration of a despreading component 38 for despreading up to N spreading codes of spreading factor SF=N and up to M spreading codes of spreading factor SF=NL.

As becomes apparent from FIG. 7, the first despreading stage 40 is identical with the first despreading stage of the previous two embodiments. Thus, a detailed description thereof is omitted. The second despreading stage 42 includes up to M branches that are individually coupled to the second outputs 52 of the first despreading stage 40. As has been mentioned before, the second outputs 52 are configured to output samples associated with spreading codes that have not yet been despread completely in the first despreading stage 40.

The second despreading stage 42 includes in each of the M branches a multiplier 70 and an adder 72. By means of the multiplier 70 periodic sequences of weights are impressed on the sample stream output by the first despreading stage 40. A single sequence of weights has a length of L. The multiplier 70 does not change the sampling rate. This means that the sampling rate r/N at the output of the multiplier 70 is identical with the sampling rate r/N at the output of the first despreading stage 40. Each multiplier 70 outputs sequences of L samples that are added by the associated adder 72 to thus reduce the sampling rate to r/(NL).

The combination of a multiplier 70 and an adder 72 is based on the fact that long spreading codes can be considered as a concatenation of shorter basic codes that have been appropriately weighted. The outputs of the M adders 72 are the despread informational data streams that have originally been spread with spreading codes of spreading factor SF=NL.

Although the three embodiments depicted in FIGS. 4, 6 and 7 have been described separately, they may be combined in different ways. For example, two or more of the second despreading stages 42 described above with reference to FIGS. 4, 6 and 7 may be arranged in parallel or in series after the first despreading stage 40. Alternatively or additionally, the first despreading stage 40 may be substituted with one or more of the second despreading stages 42 of FIGS. 4, 6 and 7.

Although embodiments of the method and apparatus of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method of despreading a multicode signal that has been generated using two or more spreading codes with different spreading factors, comprising the steps of:

subjecting the signal to a first despreading step that includes a first Fast Hadamard Transform (FHT) to jointly despread the spreading codes, that employ the different spreading factors, wherein, during the first despreading step, despreading is performed by a factor lower than or equal to the lowest spreading factor so that one or more spreading codes are despread only partially; and, subjecting the signal or a signal portion including one or more partially despread spreading codes to one or more further despreading steps;

wherein, during the first despreading step, despreading is performed by a factor equal to the lowest spreading factor so that at least one spreading code is despread completely, whereas other spreading codes are despread only partially, and wherein the method includes the additional step of outputting any informational data streams that had been spread with any spreading codes that are completely despread.

2. The method of claim 1, wherein the despreading steps are performed in a cascaded manner.

3. The method of claim 1, wherein the dimension of the first FHT corresponds to the lowest spreading factor.

4. The method of claim 1, wherein the first despreading step further includes a permutation operation.

5. The method of claim 1, wherein one or more of the despreading steps include a serial-to-parallel conversion.

6. The method of claim 1, wherein the one or more further despreading steps include at least one of a decimating operation, a summation operation, a further FHT, and a multiplication operation.

7. The method of step 6, wherein the decimating operation includes distributing a sequence of input samples according to a predefined distribution scheme over two or more signal branches.

8. A method of despreading a multicode signal that has been generated using two or more spreading codes with different spreading factors, comprising the steps of:

subjecting the signal to a first despreading step that includes a first Fast Hadamard Transform (FHT) to jointly despread the spreading codes, that employ the different spreading factors, wherein, during the first despreading step, despreading is performed by a factor lower than or equal to the lowest spreading factor so that one or more spreading codes are despread only partially; and, subjecting the signal or a signal portion including one or more partially despread spreading codes to one or more further despreading steps;

wherein the one or more further despreading steps include at least one of a decimating operation, a summation operation, a further FHT, and a multiplication operation;

wherein the decimating operation includes distributing a sequence of input samples according to a predefined distribution scheme over two or more signal branches; and, wherein in each signal branch a summation operation is performed and the outputs of the summation operations are used as input for a second FHT.

9. The method of claim 1, wherein the one or more further despreading steps include a multiplication operation that is followed by a summation operation.

10. The method of claim 1, wherein at least the first FHT is configured as a FHT with reduced operations.

11. A despreading apparatus for despreading a multicode signal that has been generated using two or more spreading codes with different spreading factors, comprising:

a first despreading stage for performing a first despreading step that includes a first Fast Hadamard Transform (FHT) to jointly despread the spreading codes that employ the different spreading factors, wherein during the first despreading step despreading is performed by a factor lower than or equal to the lowest spreading factor so that one or more spreading codes are despread only partially; and at least a second despreading stage for performing one or more further despreading steps with respect to the signal or a signal portion that includes one or more partially despread spreading codes:

wherein, during the first despreading step, despreading is performed by a factor equal to the lowest spreading factor so that at least one spreading code is despread completely, whereas other spreading codes are despread only partially, and wherein the apparatus is further operative to output any informational data streams that had been spread with any spreading codes that are completely despread.

12. A receiver for wireless communications including the despreading apparatus of claim 11.

* * * * *

UNITED STATES PATENT AND TRADEMARK OFFICE
CERTIFICATE OF CORRECTION

PATENT NO. : 7,724,719 B2 Page 1 of 1
APPLICATION NO. : 10/595008
DATED : May 25, 2010
INVENTOR(S) : Schotten It is certified that error appears in the above-identified patent and that said Letters Patent is hereby corrected as shown below:

In Column 8, Line 11, delete "FI-IT" and insert -- FHT --, therefor.

In Column 10, Line 61, in Claim 7, delete "step" and insert -- claim --, therefor.

Signed and Sealed this

Twenty-seventh Day of July, 2010

David J. Kappos
*Director of the United States Patent and Trademark Office*